US010296089B2

(12) United States Patent
Peretz et al.

(10) Patent No.: US 10,296,089 B2
(45) Date of Patent: May 21, 2019

(54) HAPTIC STYLUS

(71) Applicant: Microsoft Technology Licensing, LLC, Redmond, WA (US)

(72) Inventors: Ahia Peretz, Ramat-Gan (IL); Vadim Mishalov, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/232,955

(22) Filed: Aug. 10, 2016

(65) Prior Publication Data

US 2018/0046249 A1 Feb. 15, 2018

(51) Int. Cl.
*G06F 3/01* (2006.01)
*G06F 3/0354* (2013.01)

(52) U.S. Cl.
CPC .......... *G06F 3/016* (2013.01); *G06F 3/03545* (2013.01)

(58) Field of Classification Search
CPC ...... G06F 3/03545; G06F 3/016; G06F 3/041; G06F 2203/015; G06F 3/0412
See application file for complete search history.

(56) References Cited

U.S. PATENT DOCUMENTS

| 3,376,551 A * | 4/1968 | Armbruster | B41J 3/00 178/18.07 |
| 5,565,632 A * | 10/1996 | Ogawa | G06F 3/03545 73/862.041 |
| 7,202,862 B1 * | 4/2007 | Palay | G06F 3/03545 178/18.01 |
| 7,456,826 B2 * | 11/2008 | Jurisch | G06F 3/03542 345/179 |
| 7,511,706 B2 * | 3/2009 | Schena | G01D 7/007 178/19.01 |
| 7,522,152 B2 * | 4/2009 | Olien | G06F 3/016 345/156 |
| 7,679,611 B2 * | 3/2010 | Schena | G01D 7/007 345/179 |
| 8,416,066 B2 * | 4/2013 | Westerinen | G06F 3/016 340/407.1 |
| 8,525,530 B2 * | 9/2013 | Fukushima | H01G 5/16 324/658 |

(Continued)

FOREIGN PATENT DOCUMENTS

| CN | 203415124 | 1/2014 |
| WO | WO 2014/117125 | 7/2014 |

OTHER PUBLICATIONS

Hinckley et al. "Motion and Context Sensing Techniques for Pen Computing", Proceedings of Graphics Interface, p. 71-78, May 29, 2013.

(Continued)

*Primary Examiner* — Michael J Jansen, II

(57) ABSTRACT

A device includes a housing, a tip configured to be movable with respect to the housing, a resilient element fixed to the tip, a substrate fixed to the housing, a coil mounted or patterned on the substrate, and a controller configured to induce haptic feedback via the tip based on applying a signal to the coil. A surface of the substrate faces the resilient element. The resilient element presses against the surface in response to the tip receding toward the housing. The resilient element includes magnetic material. The signal applied on the coil induces a magnetic driving force on the resilient element.

20 Claims, 8 Drawing Sheets

(56) References Cited

U.S. PATENT DOCUMENTS

| | | | | |
|---|---|---|---|---|
| 8,525,816 | B2* | 9/2013 | Fukushima | G06F 3/03545 178/18.01 |
| 8,803,671 | B2* | 8/2014 | Westerinen | G06F 3/016 340/407.1 |
| 8,884,932 | B2* | 11/2014 | Fukushima | G06F 3/03545 178/19.04 |
| 8,913,041 | B2* | 12/2014 | Fukushima | G06F 3/03545 345/179 |
| 8,952,939 | B2* | 2/2015 | Lee | B44F 11/02 345/179 |
| 9,098,131 | B2* | 8/2015 | Jeong, II | G06F 3/044 |
| 9,201,520 | B2 | 12/2015 | Benko et al. | |
| 9,239,622 | B2* | 1/2016 | Park | G06F 3/016 |
| 9,261,990 | B2* | 2/2016 | Choi | G06F 3/041 |
| 9,298,285 | B2* | 3/2016 | Mohindra | G06F 3/03545 |
| 9,310,898 | B2* | 4/2016 | Son | G06F 3/03545 |
| 9,395,862 | B2* | 7/2016 | Kim | G06F 3/041 |
| 9,483,120 | B2* | 11/2016 | Park | G06F 3/016 |
| 9,495,011 | B1* | 11/2016 | Lee | G06F 3/016 |
| 9,513,719 | B2* | 12/2016 | Ito | G06F 3/044 |
| 9,513,721 | B2* | 12/2016 | Stern | G06F 3/03545 |
| 9,529,458 | B2* | 12/2016 | Obata | G06F 3/03545 |
| 9,569,041 | B2* | 2/2017 | Son | G06F 3/046 |
| 9,575,572 | B2* | 2/2017 | Park | G06F 3/041 |
| 9,690,377 | B2* | 6/2017 | Lee | G06F 3/016 |
| 9,690,398 | B2* | 6/2017 | Li | G06F 3/03545 |
| 9,727,150 | B2* | 8/2017 | Stern | G06F 3/03545 |
| 9,829,987 | B2* | 11/2017 | Bandt-Horn | G06F 3/0202 |
| 9,841,828 | B2* | 12/2017 | Peretz | G06F 3/03545 |
| 9,864,440 | B2* | 1/2018 | Geller | G06F 3/03545 |
| 9,874,951 | B2* | 1/2018 | Stern | G06F 3/044 |
| 9,898,101 | B2* | 2/2018 | Ishikawa | G06F 3/03545 |
| 2001/0038384 | A1* | 11/2001 | Fukushima | G06F 3/03545 345/179 |
| 2005/0104870 | A1* | 5/2005 | Jurisch | G06F 3/03542 345/179 |
| 2005/0248549 | A1* | 11/2005 | Dietz | G06F 3/016 345/179 |
| 2005/0275967 | A1* | 12/2005 | Olien | G06F 3/016 345/156 |
| 2008/0143693 | A1* | 6/2008 | Schena | G01D 7/007 345/179 |
| 2009/0184923 | A1* | 7/2009 | Schena | G01D 7/007 345/156 |
| 2009/0251623 | A1* | 10/2009 | Koyama | G06F 3/03545 348/789 |
| 2010/0160041 | A1 | 6/2010 | Grant et al. | |
| 2011/0241703 | A1* | 10/2011 | Fukushima | H01G 5/16 324/662 |
| 2011/0267182 | A1* | 11/2011 | Westerinen | G06F 3/016 340/407.2 |
| 2011/0304577 | A1* | 12/2011 | Brown | G06F 3/03545 345/174 |
| 2012/0098798 | A1* | 4/2012 | Lee | G06F 3/03545 345/179 |
| 2012/0280947 | A1 | 11/2012 | Weaver et al. | |
| 2013/0088465 | A1* | 4/2013 | Geller | G06F 3/03545 345/179 |
| 2013/0147748 | A1* | 6/2013 | Westerinen | G06F 3/016 345/173 |
| 2013/0222294 | A1* | 8/2013 | Choi | G06F 3/041 345/173 |
| 2013/0307829 | A1* | 11/2013 | Libin | G06F 3/016 345/179 |
| 2014/0028592 | A1* | 1/2014 | Wang | G06F 3/03545 345/173 |
| 2014/0043242 | A1 | 2/2014 | Dietz et al. | |
| 2014/0078105 | A1* | 3/2014 | Son | G06F 3/046 345/174 |
| 2014/0132529 | A1* | 5/2014 | Jeong, II | G06F 3/044 345/173 |
| 2014/0146021 | A1 | 5/2014 | Trethewey et al. | |
| 2014/0168124 | A1* | 6/2014 | Park | G06F 3/016 345/173 |
| 2014/0168175 | A1 | 6/2014 | Mercea et al. | |
| 2014/0210756 | A1* | 7/2014 | Lee | G06F 3/016 345/173 |
| 2014/0210781 | A1 | 7/2014 | Stern | |
| 2014/0218338 | A1* | 8/2014 | Kim | G06F 3/041 345/174 |
| 2014/0245139 | A1* | 8/2014 | Lee | G06F 3/0488 715/702 |
| 2014/0285453 | A1* | 9/2014 | Park | G06F 3/016 345/173 |
| 2014/0292696 | A1* | 10/2014 | Son | G06F 3/03545 345/173 |
| 2014/0333553 | A1* | 11/2014 | Yun | G06F 3/016 345/173 |
| 2015/0015499 | A1* | 1/2015 | Park | G06F 3/041 345/173 |
| 2015/0029161 | A1* | 1/2015 | Koo | B43K 29/00 345/179 |
| 2015/0035807 | A1* | 2/2015 | Ito | G06F 3/044 345/179 |
| 2015/0070330 | A1* | 3/2015 | Stern | G06F 3/03545 345/179 |
| 2015/0084934 | A1* | 3/2015 | Ho | G06F 3/03545 345/179 |
| 2015/0084935 | A1* | 3/2015 | Lien | G06F 3/03545 345/179 |
| 2015/0097815 | A1* | 4/2015 | Lee | G06F 3/03545 345/179 |
| 2015/0116289 | A1* | 4/2015 | Stern | G06F 3/03545 345/179 |
| 2015/0160744 | A1* | 6/2015 | Mohindra | G06F 3/03545 345/179 |
| 2015/0169056 | A1 | 6/2015 | Weddle et al. | |
| 2015/0205367 | A1* | 7/2015 | Bandt-Horn | G06F 3/0202 345/156 |
| 2015/0212578 | A1* | 7/2015 | Lor | G06F 3/016 345/173 |
| 2015/0309598 | A1 | 10/2015 | Zeliff et al. | |
| 2015/0317001 | A1* | 11/2015 | Ben-Bassat | G06F 3/03545 345/179 |
| 2015/0346849 | A1* | 12/2015 | Obata | G06F 3/03545 345/179 |
| 2016/0054820 | A1 | 2/2016 | Sezgin et al. | |
| 2016/0124530 | A1* | 5/2016 | Stern | G06F 3/03545 345/179 |
| 2016/0132118 | A1* | 5/2016 | Park | G06F 3/016 345/173 |
| 2016/0274684 | A1* | 9/2016 | Li | G06F 3/03545 |
| 2016/0282970 | A1* | 9/2016 | Evreinov | G06F 3/03545 |
| 2016/0364024 | A1* | 12/2016 | Lien | G06F 1/26 |
| 2017/0045961 | A1* | 2/2017 | Stern | G06F 3/03545 |
| 2017/0068345 | A1* | 3/2017 | Barel | G06F 3/03545 |
| 2017/0108956 | A1* | 4/2017 | Tang | B43K 24/00 |
| 2017/0242501 | A1* | 8/2017 | Tang | G06F 3/03545 |
| 2017/0285774 | A1* | 10/2017 | Parikh | G06F 3/03545 |
| 2018/0046249 | A1* | 2/2018 | Peretz | G06F 3/03545 |

OTHER PUBLICATIONS

Perez "Active Pen Haptic: Polymer Actuator", Microsoft Surface, p. 1-10, 2015.

Wacker Chemie AG "Silicones With Magnetic Properties", Wacker Chemie AG, Innovations Magazine, 2 P., Mar. 30, 2016.

International Search Report and the Written Opinion Dated Oct. 25, 2017 From the International Searching Authority Re. Application No. PCT/US2017/045004. (13 Pages).

* cited by examiner

HAPTIC STYLUS

FIELD AND BACKGROUND OF THE INVENTION

Signal emitting styluses such as active styluses, are known in the art for use with a digitizer system. Positions of the stylus provide inputs to a computing device associated with the digitizer system and are interpreted as user commands. Often, the digitizer system is integrated with a display screen to form a touch-screen.

Digitizer systems may include a matrix of electrode junctions arranged in rows and columns. Tracking is typically based on detecting a signal emitted at a tip of the stylus and picked up by the digitizer sensor due to electrostatic coupling established between the tip and a portion of the matrix.

SUMMARY OF THE INVENTION

The disclosure in some embodiments relates to a haptic actuator that is integrated into a handheld device and to a handheld device including the haptic actuator. The handheld device may be for example a stylus configured to interact with a computing device that includes a digitizer system, e.g., a touch enabled computing device. In some exemplary embodiments, the haptic actuator provides haptic feedback by actuating movement of a tip of the handheld device.

Alternatively, the haptic actuator may actuate movement of another element of the handheld device that is movable with respect to a housing of the handheld device. Movement may be actuated along a single axis or may be selectively actuated in three dimensions (3D). Haptic feedback may be defined based on pressure applied on the tip, velocity of the handheld device, tilt angle of the handheld device, button selection on the handheld device and input from a touch enabled computing device that is interacting with the handheld device.

According to some exemplary embodiments, the haptic actuator includes an electromagnet and a permanent magnet that are magnetically coupled to each other.

According to some embodiments of the present disclosure, the permanent magnet is a resilient element attached to the tip that is used to both provide a resilient response to contact pressure applied on the tip and to actuate the haptic feedback. Activation of the haptic actuator may be controlled by controlling input to the electromagnet to generate a magnetic field that actuates movement of the permanent magnet. In some exemplary embodiments, the permanent magnet has conductive properties and is also operated as an electrode for detecting pressure applied on the tip based on a sensed capacitive coupling between the permanent magnet and another conductive element that is stationary with respect a housing of the stylus.

Unless otherwise defined, all technical and/or scientific terms used herein have the same meaning as commonly understood by one of ordinary skill in the art. Although methods and materials similar or equivalent to those described herein can be used in the practice or testing of embodiments of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings:

FIG. 1 is a simplified block diagram of an exemplary stylus in accordance with some embodiments of the present disclosure;

FIG. 2 showing a simplified flow chart of an exemplary method for operating a stylus in accordance with some exemplary embodiments of the present disclosure;

Figure 6A:
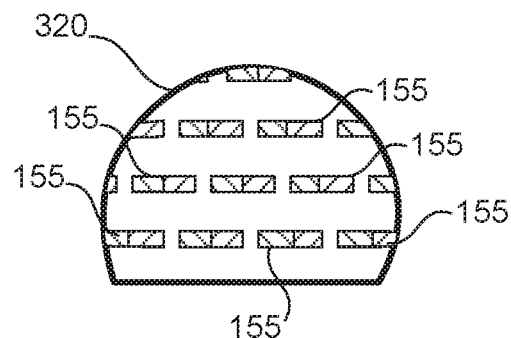
Figure 6B:
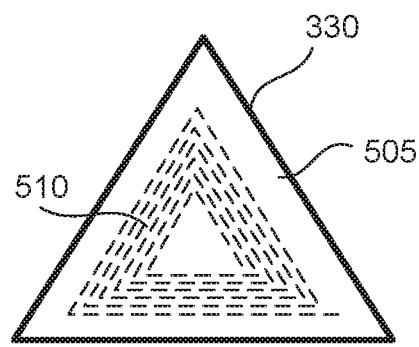
Figure 6C:
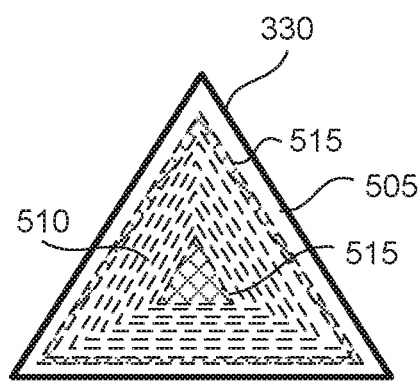
Figure 7:
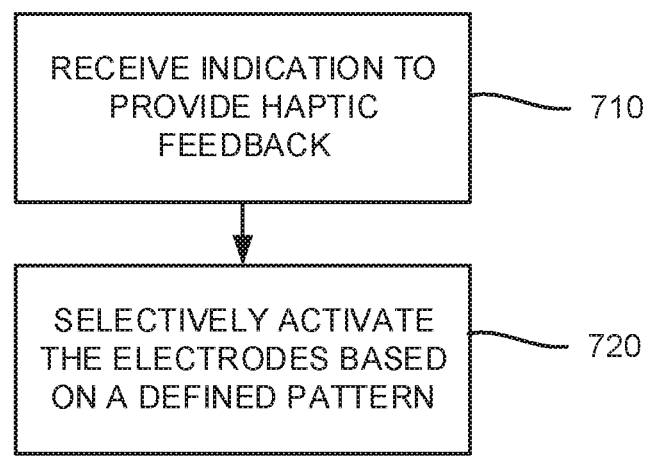

FIGS. 6A, 6B and 6C are simplified schematic drawings of an exemplary permanent magnet, an exemplary wall of the pyramid structure integrated with a coil and an alternate exemplary wall integrated with a exemplary coil and electrode all in accordance with some embodiments of the present disclosure; and FIG. 7 is a simplified flow chart of an exemplary method for providing 3D haptic feedback in accordance with some exemplary embodiments of the present disclosure.

DESCRIPTION OF SPECIFIC EMBODIMENTS OF THE INVENTION

According to some exemplary embodiments, haptic feedback in a handheld device is generated by actuating movement of a resilient element that is also configured to provide a resilient response to contact pressure applied on an interacting element of the device. Optionally, the device is a stylus and the interacting element is a writing tip of the stylus. In some exemplary embodiments, the resilient element presses against a substrate that is fixed to a housing of the device when pressure is applied. Typically, the resilient element is magnetized. The resilient element may be magnetized, for example, by embedding the resilient material with magnetic particles. A coil positioned in the device may be operated as an electromagnet to generate a magnetic field that actuates movement of the resilient element. The coil may be a planar coil or flat coil patterned on the substrate that the resilient element presses against, or may be a 3D coil that encompasses the resilient element. In this manner, haptic feedback feature may be added to a handheld device without significantly increasing space, number of parts, and cost for manufacturing the handheld device. Typically, the resilient response of resilient element 150 (shown in FIG. 1) facilitate the movement required for haptic feedback.

In some exemplary embodiments, uni-axial haptic feedback is provided with a generally flat resilient element coupled to a coil that is patterned or mounted on the substrate on which the resilient element presses against. The coil may be interchangeably operated as an electromagnet and as an electrode. Optionally, when the coil is operated as an electromagnet, the electromagnet may actuate movement of the resilient element in one direction and the resilient element may respond by pushing in the opposite direction. Optionally, 3D haptic feedback is provided with a rounded resilient element that presses against more than one substrate, each substrate angled in different directions and associated with a coil that may be selectively controlled to operate simultaneously or separately. Each coil may be operated as an electromagnet and may actuate movement in a defined direction.

According to some exemplary embodiments, the resilient element is conductive and is also used to monitor contact pressure applied on the interacting element. Typically, the interacting element is the writing tip. Optionally, the resilient element is positioned and sized to be capacitively coupled with the coil or with a dedicated electrode and to effect changes in capacitive coupling based on its deformation under pressure. Changes in the capacitive coupling may be detected and related to pressure applied on the interactive element on which the resilient element is fixed.

According to some exemplary embodiments, a handheld device initiates haptic feedback based on one or more of pressure applied on its interacting element, velocity of the handheld device, tilt angle of the handheld device, button selection on the handheld device, and input from a touch enabled computing device that is interacting with the handheld device. In some exemplary embodiments, amplitude and frequency of a signal applied to actuate the feedback and direction at which the element is moved may be selectively controlled based on a command that is received by the handheld device or based on output from one of more sensors or buttons included in the handheld device. Optionally, the handheld device is a stylus and haptic feedback is provided by actuating movement of the writing tip of the stylus.

Figure 1:
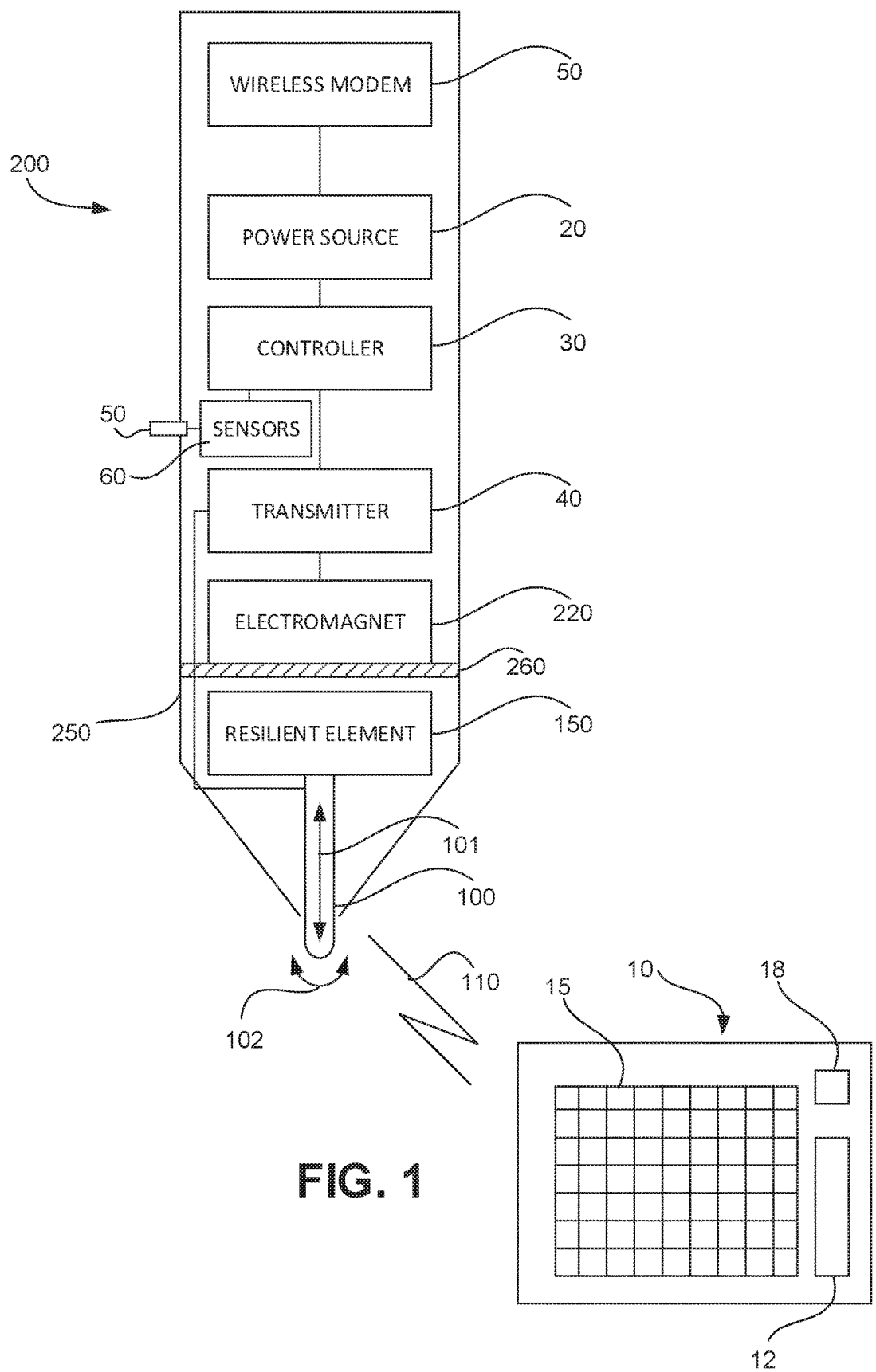

Reference is now made to FIG. 1 showing a simplified block diagram of an exemplary stylus and a touch enabled computing device in accordance with some embodiments of the present disclosure. Stylus 200 may typically be an active stylus that communicates with a digitizer sensor 15 of computing device 10 by transmitting signals 110 via its tip 100. The signals emitted by the stylus may include information such as detected pressure applied on the writing tip and stylus identification. Signals encoded with information may be decoded by the digitizer system. Positions of the stylus over the touch-screen may be correlated with virtual information portrayed on the screen. The stylus may also directly communicate with the computing device via other wireless communication channels, e.g. Bluetooth and near field communication (NFC).

In some exemplary embodiments, a transmitter 40 in stylus 200 generates signals 110 based on input from controller 30. Operation of stylus 200 is typically controlled by controller 30 and powered by power source 20.

Typically, signals 110 that are transmitted via tip 100 may be picked up by the digitizer sensor 15 due to electrostatic coupling established between tip 110 and a portion of digitizer sensor 15 near tip 110. Signals 110 may be beacon signals for tracking a location of tip 100 on the digitizer sensor 15 or signals encoded with information. Optionally, stylus 200 may additionally include a wireless modem 50 that may communicate with a corresponding modem 18 of computing device 10 to exchange information and communicate commands. Stylus 200 may also include one or more user selections buttons 50 and one or more sensors for detecting button selection of button 50, tilt of stylus 200, or battery state. One or more circuits 12 associated with device 10 may control and process information that is communicated between stylus 200 and device 10.

According to some exemplary embodiments of the present disclosure, stylus 200 also provides haptic feedback to a user by actuating movement of a resilient element 150 attached to tip 100. The actuated movement is typically with respect to housing 250. Tip 100 is typically movable in longitudinal direction 101 of stylus 200 and may optionally have some degree of movement in directions 102 that are perpendicular to longitudinal direction 101. Resilient element 150 is typically pressed against a structural element 260 fixed to housing 250 and provides a resilient response as tip 100 recedes into housing 250 due to contact pressure applied on tip 100.

According to some exemplary embodiments of the present disclosure, resilient element 150 is magnetized and moves in response to magnetic fields generated with a coil 220.

Typically, controller 30 controls the signals generated by transmitter 40 for activating coil 220. In some exemplary embodiments, controller 30 alternates between transmitting a signal 110 via tip 100 for communication with digitizer sensor 15 and transmitting a signal to coil 220 for actuating haptic feedback.

In some exemplary embodiments, pressure applied on tip 100 is sensed by stylus 200. Optionally, resilient element 150 includes or is formed with conductive material and pressure is monitored based on a detected capacitive coupling between resilient element 150 and an electrode fixed to surface 260 or fixed with respect to housing 250. Typically controller 30 controls electrifying resilient element 150 and sampling output from the electrode to detect capacitive coupling. Optionally, coil 220 may be operated as the electrode and controller 30 may intermittently detect capacitive coupling between resilient element 150 and coil 220 to monitor pressure applied on tip 100. In some exemplary embodiments, resilient element 150 and tip 100 are electrically connected and pressure sensing is performed based on signals 110 transmitted on tip 100.

Figure 2:
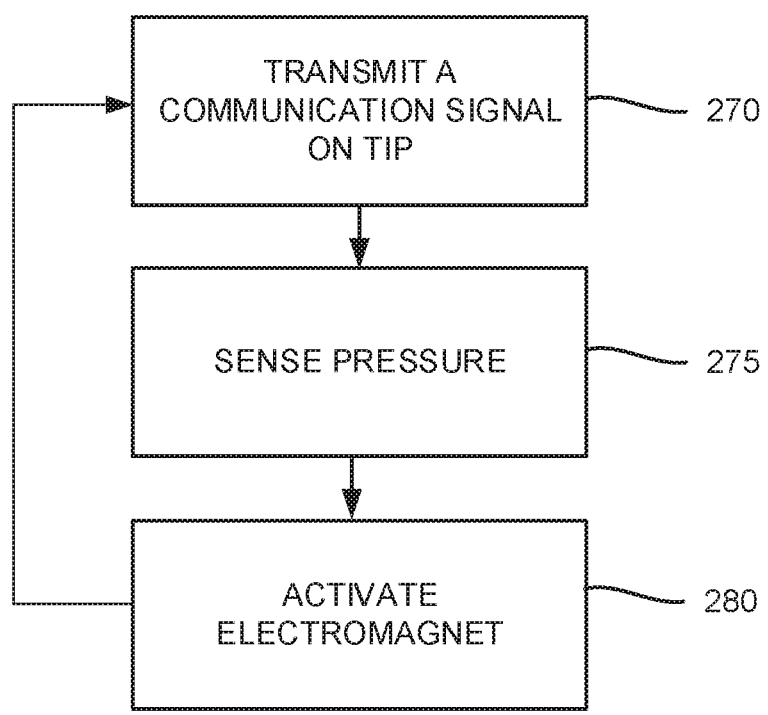

Reference is now made to FIG. 2 showing a simplified flow chart of an exemplary method for operating a stylus in accordance with some exemplary embodiments of the present disclosure. According to some exemplary embodiments, a controller 30 alternates between transmitting a signal 110 on tip 100 (block 270) for communicating with a digitizer sensor and transmitting a signal on coil 220 to actuate haptic feedback (block 280). In some exemplary embodiments, pressure applied on tip 100 is sensed during transmission of signal 110 (block 275). In some exemplary embodiments, the haptic feedback provided is based on or is a function of the sensed pressure. In some exemplary embodiments, the haptic feedback provided is based on input for a tilt sensor included in stylus 200, a button selection on stylus 200, based on information received from computing device 10 via wireless modem 50 or based on information stored in memory associated with controller 30. Typically, the haptic feedback provided is defined based on amplitude, frequency and duration of the signal transmitted on coil 220.

Figure 3A:
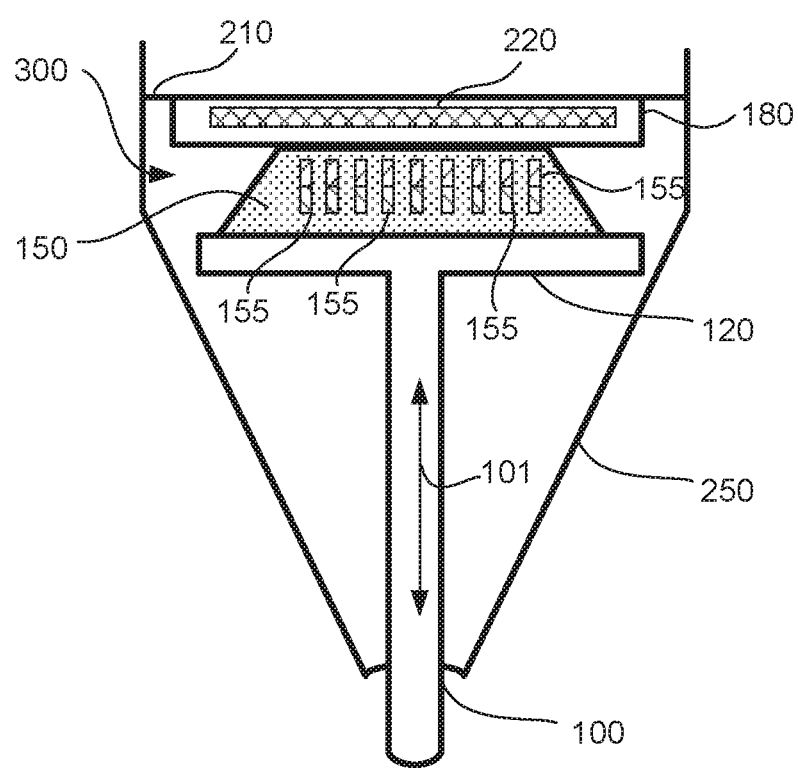
FIGS. 3A and 3B are simplified schematic drawings of elements of a uni-axial haptic actuator including a resilient element shown in a neutral and compressed state respectively in accordance with some embodiments of the present disclosure.
Figure 3B:
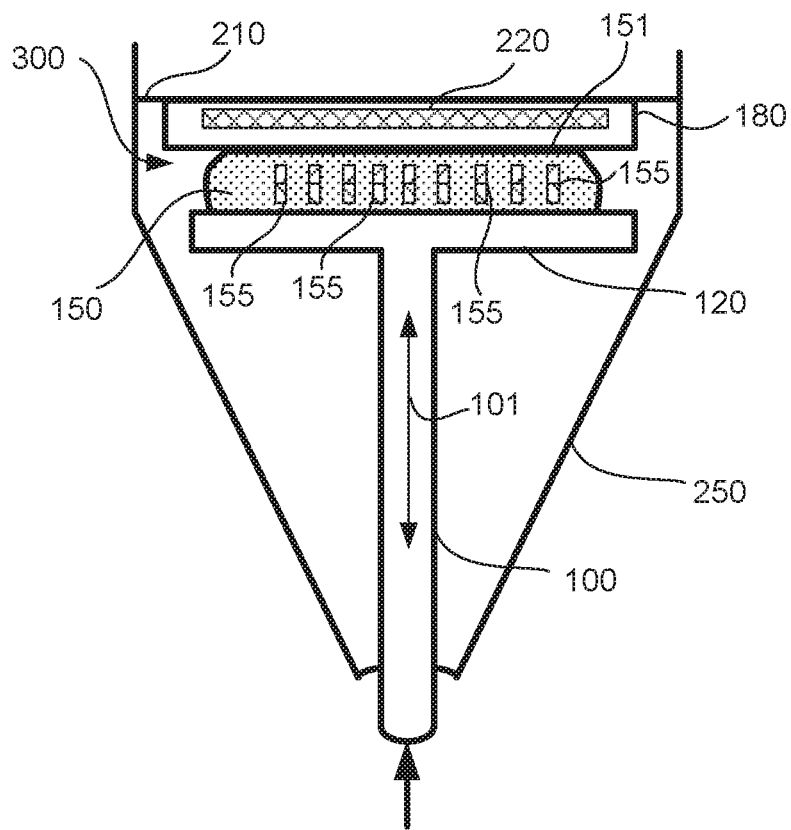
Figure 3C:
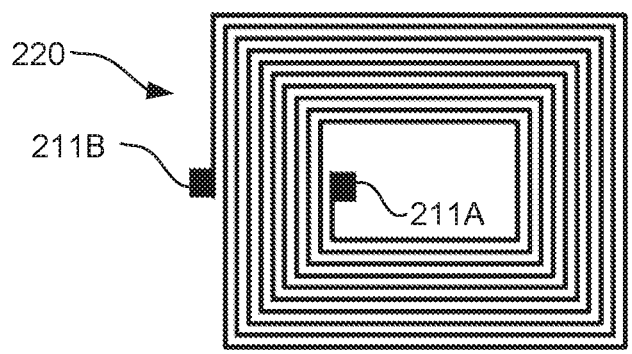
FIG. 3C is a simplified schematic drawing of an electromagnet of the haptic actuator in accordance with some embodiments of the present disclosure.

Reference is now made to FIGS. 3A and 3B showing simplified schematic drawings of elements of a uni-axial haptic actuator including a resilient element shown in a neutral and compressed state respectively and to FIG. 3C showing a simplified schematic drawing of a coil of the haptic actuator in accordance with some embodiments of the present disclosure. According to some embodiments of the present disclosure, a haptic actuator 300 includes a coil 220 that may be operated as an electromagnet to actuate movement of a resilient element 150. Typically, resilient element 150 is a resilient or deformable permanent magnet that responds to magnetic fields generated by coil 220. In some exemplary embodiments, resilient element 150 may be an elastomer, e.g., silicone, that is embedded with magnetic particles 155.

Optionally, resilient element 150 is a magnetite filled high consistency rubber such as ELASTOSIL® R 781/80 provided by WACKER. Typically, tip 100 moves together with resilient element 150 to provide the haptic feedback felt by the user.

In some exemplary embodiments, resilient element 150 is a flat disk shaped element and that is supported on tip 100 with a flange member 120 that extends from tip 100. Optionally, resilient element 150 includes a wall that tapers in a direction distal to flange member 120.

In some exemplary embodiments, a substrate 180 fixed to a structural element 210 of housing 250 is positioned to face resilient element 150 so that resilient element 150 presses against substrate 180 as contact pressure is applied on tip 100 in a direction that forces tip 100 to recede toward housing 250. In some exemplary embodiments, a surface 151 of resilient element 150 that makes contact with substrate 180 increases its surface area as resilient element 150 presses against substrate 180. (FIG. 3B) Typically, compression of resilient element 150 and movement of tip 100 is uni-axial along longitudinal direction 101.

According to some embodiments of coil 220 is mounted or patterned on a surface of substrate 180. In some exemplary embodiments, coil 220 is patterned on a surface of substrate 180 that is distal from resilient element 150 or is otherwise physically separated from resilient element 150 with a layer of non-conductive or dielectric material included in substrate 180. According to some exemplary embodiments, a signal transmitted in coil 220 generates a magnetic field that actuates movement of resilient element 150 together with tip 100 along the longitudinal axis 101. A magnetic field is typically generated on coil 220 by applying voltage between terminals of coil 220, e.g., terminal 211A and terminal 211B, so that current flows through coil 220. The haptic feedback provided may be defined based on a frequency and amplitude of the applied signal. Typically, the voltage and frequency applied on coil 220 for magnifying the coil is significantly lower than the voltage and frequency applied on tip 100 for transmitting a signal to digitizer sensor 15 while the current applied on coil 220 for magnifying may be significantly higher. In some exemplary embodiments, magnetic coupling between coil 220 and resilient element increases as resilient element 150 flattens up against substrate 180 and weakens as the resilient element is restored to its neutral shape. Optionally, haptic feedback is intensified with an increase in magnetic coupling. Alternatively, the magnetic coupling is not altered by deformation of resilient element 150.

In some exemplary embodiments, coil 220 may also be operated as an electrode and pressure applied on tip 100 may be detected based on detected capacitive coupling between resilient element 150 and coil 220. The capacitive coupling typically increases with increasing pressure due to movement and deformation of resilient element 150 toward coil 220. While operating coil 220 to detect pressure, terminal 211A and 211B may typically be shorted so that a same voltage is applied on coil 220. Capacitive coupling may then be detected by applying a signal on coil 220 and detecting a corresponding output on resilient element 150 or by applying a signal on resilient element 150 and detecting a corresponding output on coil 220.

Typically, resilient element 150 is conductive or includes conductive elements and is capacitively coupled with conductive material of electromagnet 220 based on proximity and area of overlap between the elements. Typically, a level of capacitive coupling is sensitive to deformation of resilient element 150. As resilient element is pressed against substrate 150 overlap between a surface area of resilient element 150 and coil 220 increases which typically increases the capacitive coupling. Optionally, resilient element 150 is electrically connected to tip 100 and output from coil 220 may be detected during signal transmission on tip 100 for detecting a level of capacitive coupling.

Figure 4A:
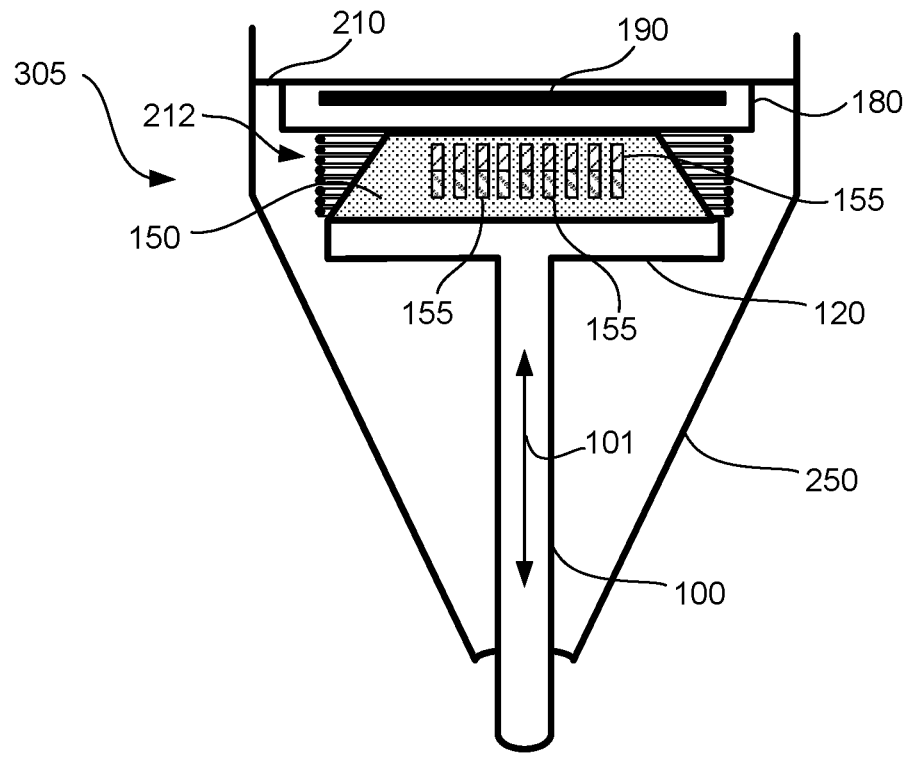
FIGS. 4A and 4B are simplified schematic drawing of a uni-axial haptic actuator including a cylindrical coil and a simplified schematic drawing of an exemplary cylindrical coil in accordance with some embodiments of the present disclosure.
Figure 4B:
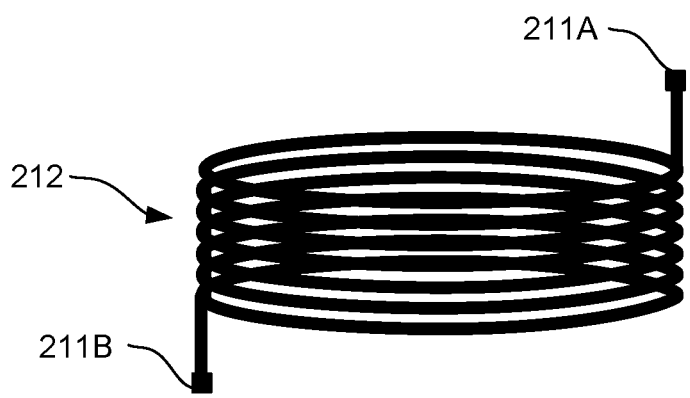

Reference is now made to FIGS. 4A and 4B showing a simplified schematic drawing of a uni-axial haptic actuator including a cylindrical coil and a simplified schematic drawing of an exemplary cylindrical coil in accordance with some embodiments of the present disclosure. According to some exemplary embodiments, haptic actuator 305 includes a coil 212, e.g., a magnetic coil, that is wrapped around resilient element 150 as opposed to being patterned on substrate 180. Coil 212 may be a cylindrically shaped coil that is mounted on substrate 180 and encompasses resilient element 150. Typically, haptic actuator 301 actuates movement of resilient element 150 with tip 100 along longitudinal direction 101 similar to the movement provided by haptic actuator 300 (FIGS. 3A and 3B).

According to some exemplary embodiments of the present disclosure, substrate 180 includes a dedicated electrode 190 for detecting pressure applied on tip 100 based on capacitive coupling with resilient element 150. Optionally, electrode 190 may be an electrode that is patterned on substrate 180. In some exemplary embodiments, controller 150 may periodically apply a signal on resilient element 150 or electrode 190 to detect the capacitive coupling between resilient element 150 and electrode 190 and thereby monitor pressure as described for example in reference to FIGS. 3A, 3B and 3C.

Figure 5A:
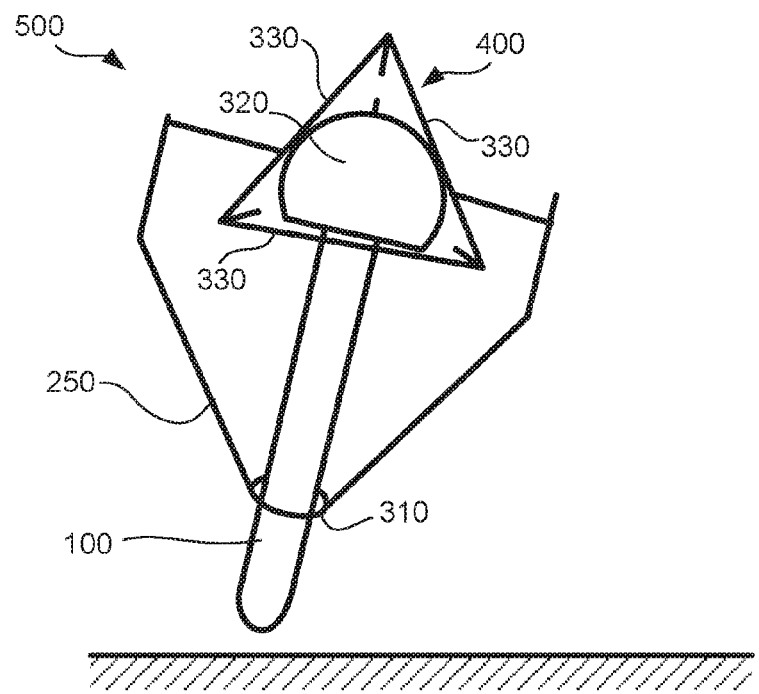
FIGS. 5A and 5B are simplified schematic drawing of a 3D haptic actuator in accordance with some embodiments of the present disclosure.
Figure 5B:
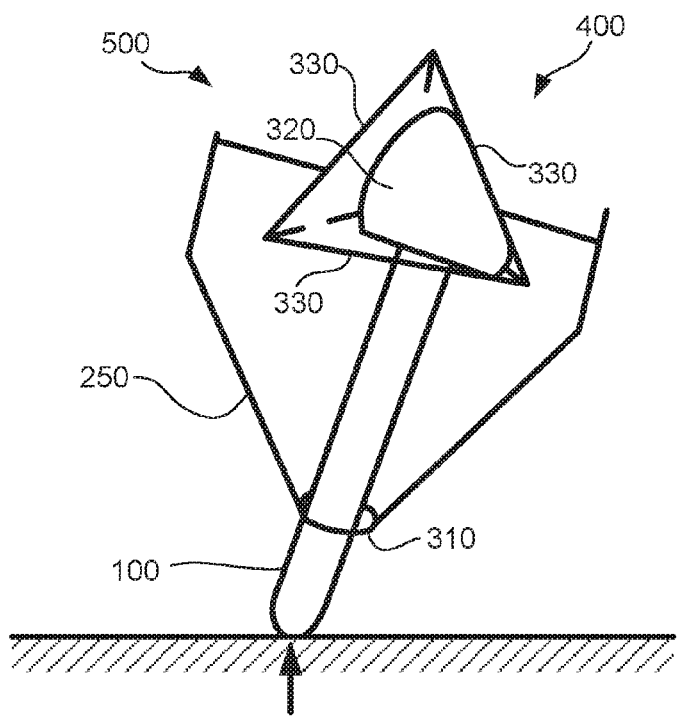

Reference is now made to FIGS. 5A and 5B showing simplified schematic drawing of a 3D haptic actuator, to FIGS. 6A and 6B showing simplified schematic drawings of an exemplary coil embedded in a wall of the pyramid structure, and to FIG. 6C showing an exemplary magnetized elastomer head, all in accordance with some embodiments of the present disclosure.

According to some exemplary embodiments, writing tip 100 is an elongated element that extends into housing 250 through a collar 310. A resilient element 320 may be fixedly attached to an end of tip 100 and fitted into a hallow pyramid structure 400. Typically, pyramid structure 400 is fixedly attached to housing 250. Resilient element 320 may be a substantially rounded, e.g., spherical or hemispherical, and may press against each wall 330 of pyramid structure 400. Deformation of resilient element 320 is typically based on movement or tilt of tip 100 with respect to pyramid structure 400 and housing 250. Writing tip 100 may tilt against collar 310 of housing 250 as well as slide through collar 310 while resilient element 320 provides a resilient reaction force in 3D as it compresses against walls 330.

According to some exemplary embodiments, a haptic actuator 500 includes a plurality of coils, each coil 510 of the plurality integrated on a wall 330 of pyramid structure 400 (FIG. 6B) and a rounded resilient element 320 that is magnetized. In some exemplary embodiments, resilient element 320 may be an elastomer, e.g., silicon, that is embedded with magnetic particles 155. Optionally, resilient element 320 is a magnetite filled high consistency rubber such as ELASTOSIL® R 781/80 provided by WACKER. Typically, tip 320 moves together with resilient element 150 to provide the haptic feedback felt by the user.

According to some embodiments, coil 510 may be mounted or patterned on a surface of wall or substrate 330. In some exemplary embodiments, coil 510 is patterned on a surface of substrate 330 that is distal from resilient element 320 or is otherwise physically separated from resilient element 320 with a layer of non-conductive or dielectric material. According to some exemplary embodiments, a signal transmitted in coil 510 generates a magnetic field that actuates movement of resilient element 320 together with tip 100 in a direction that is perpendicular to wall 330 on which coil 510 is patterned. Coil 510 operates as an electromagnet when the signal is transmitted on coil 510. Typically, each coil 510 actuate movement in a different direction when magnified due to orientation of wall 330 on which it is patterned. In some exemplary embodiments, movement in a direction along a length of tip 100 is actuated by simultaneously transmitting a same signal on each coil 510. Coil 510 on each wall 330 may be activated simultaneously or separately to actuate a desired movement pattern of tip 100. Typically, an intensity and direction of the haptic feedback is based on an amplitude and frequency of a signal transmitted on each coil 510.

In some exemplary embodiments, a pressure applied by resilient element 320 on pyramid structure 400 may be sensed based on a detected capacitive coupling between resilient element 320 and a conductive element that is integrated on each of walls 330. In some exemplary embodiments, the conductive element is the conductive material of coil 510. In other exemplary embodiments, dedicated electrode(s) 515 for sensing pressure is patterned on each of walls 330.

Optionally, sensed pressure provides 3D input to the haptic actuator and may be used to define or adapt current injected on to coil 510. Optionally, the haptic feedback may be defined to reflect pressure applied on tip 100 or may be defined in along a same direction as a direction at which the pressure is detected.

Reference is now made to FIG. 7 showing a simplified flow chart of an exemplary method for providing 3D haptic feedback in accordance with some exemplary embodiments of the present disclosure. In some exemplary embodiments, 3D haptic feedback may be defined based on detected pressure on tip 100, may be defined based on a command received from a computing device, or may be pre-defined and stored in memory associated with the stylus. Typically, controller 30 receives indication to activate the haptic actuator based on output from a sensor of the handheld device or based on a command received from computing device 10 (block 710). Based on input received with the indication, a controller defines amplitude, frequency and delay for selectively activating each of coil 510 that will provide the desired feedback (block 720).

According to an aspect of some embodiments of the present invention there is provided a device including: a housing; a tip configured to be movable with respect to the housing; a resilient element fixed to the tip, wherein the resilient element includes magnetic material; a substrate fixed to the housing, wherein a surface of the substrate is positioned to face the resilient element and wherein the resilient element is configured to press against the surface in response to the tip receding toward the housing; a coil mounted or patterned on the substrate; and a controller configured to induce haptic feedback via the tip based on applying a signal to the coil, wherein the signal applied is configured to induce a magnetic driving force on the resilient element.

Optionally, the resilient element is formed from an elastomer embedded with magnetic particles.

Optionally, the resilient element includes conductive material and is capacitively coupled to conductive material of the coil.

Optionally, an electrode patterned on the substrate, wherein the electrode is positioned on the substrate to be capacitively coupled with the resilient element.

Optionally, the controller is configured to detect changes in the capacitive coupling based on deformation of the resilient element as it presses against the surface.

Optionally, the controller is configured to detect pressure applied on the tip based on the detected capacitive coupling.

Optionally, the haptic feedback is based on the pressure detected.

Optionally, the device includes a tilt sensor and wherein the haptic feedback is based on output from the tilt sensor.

Optionally, the coil is a planar coil that is patterned on the substrate.

Optionally, the device includes a plurality of substrates formed in a pyramid structure, wherein each of at least two substrates is patterned with a planar coil that is magnetically coupled to the resilient element.

Optionally, the resilient element is a rounded element fitted into the pyramid structure and configured to press against each of the substrates of the pyramid structure.

Optionally, the controller is configured to simultaneously apply signals on each of the planar coils, wherein in the signals are either the same signal or signals that differ in at least one of amplitude, frequency and phase.

Optionally, the tip is configured to both tilt and recede into the housing based on contact pressure applied on the tip and wherein the control is configured to apply haptic feedback in three dimensions based on applying signals to each of the planar coils.

Optionally, the controller is configured to detect force applied on the tip in three dimensions based on a detected capacitive coupling between the resilient element and a conductive element on each of the substrates, wherein the conductive element is the planar coil or an electrode patterned on the substrate.

Optionally, the resilient element is a generally flat element that is fixed to the tip at a normal angle with respect to the tip and the coil is mounted on the surface of the substrate and encompassing the resilient element.

According to an aspect of some embodiments of the present invention there is provided a method including: fixing a resilient element to a tip that extends out of a housing and is movable with respect to the housing, wherein the resilient element includes magnetic material; positioning a substrate to face the resilient element, wherein the substrate is fixed to the housing and wherein the resilient element is configured to press against the surface in response to the tip receding toward the housing; wherein the substrate includes a coil that is mounted or patterned on the substrate; and inducing haptic feedback via the tip based on applying a signal on the coil, wherein the signal applied is configured to induce a magnetic driving force on the resilient element.

Optionally, the method includes detecting pressure on the tip based on changes in the capacitive coupling between the resilient element and a conductive element on the substrate, wherein the changes in capacitive coupling is based on deformation of the resilient element as it presses against the surface.

Optionally, the method includes defining the haptic feedback based on the pressure detected.

Optionally, the method includes fitting the resilient element in a pyramid structure formed with a plurality of substrates, wherein at least two of the plurality of substrates includes a coil.

Optionally, the method includes simultaneously applying signals on each planar coil, wherein in the signals are either the same signal or signals that differ in at least one of amplitude, frequency and phase.

Certain features of the examples described herein, which are, for clarity, described in the context of separate embodiments, may also be provided in combination in a single embodiment. Conversely, various features of the examples described herein, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

What is claimed is:

1. A device comprising:
   a housing;
   a tip configured to be movable with respect to the housing;
   a resilient element fixed to the tip, wherein the resilient element includes magnetic material, wherein the magnetic material is formed from conductive material;
   a plurality of substrates formed in a pyramid structure fixed to the housing, wherein a surface of each substrate is positioned to face the resilient element and wherein the resilient element is configured to press against at least one surface in response to the tip receding toward the housing;
   a coil patterned on at least two substrates; and
   a controller configured:
   apply current flow in the coil to induce haptic feedback via the tip, wherein the current flow is configured to induce a magnetic driving force on the resilient element; and
   detect capacitive coupling between the coil and the magnetic material of the resilient element based on applying a constant voltage across the coil, wherein the capacitive coupling is related pressure on the tip.

2. The device according to claim 1, wherein the resilient element is formed from an elastomer embedded with magnetic particles.

3. The device according to claim 1, wherein the controller is configured to detect changes in the capacitive coupling based on deformation of the resilient element as it presses against at least one surface.

4. The device according to claim 3, wherein the controller is configured to detect pressure applied on the tip based on the detected capacitive coupling.

5. The device according to claim 4, wherein the haptic feedback is based on the pressure detected.

6. The device according to claim 1, wherein the device includes a tilt sensor and wherein the haptic feedback is based on output from the tilt sensor.

7. The device according to claim 1, comprising wherein each of at least two substrates is patterned with a planar coil that is magnetically coupled to the resilient element.

8. The device according to claim 7, wherein the resilient element is a rounded element fitted into the pyramid structure and configured to press against each of the substrates of the pyramid structure.

9. The device according to claim 7, wherein the controller is configured to simultaneously apply signals on each of the planar coils, wherein the signals are either the same signal or signals that differ in at least one of amplitude, frequency and phase.

10. The device according to claim 7, wherein the tip is configured to both tilt and recede into the housing based on contact pressure applied on the tip and wherein the controller is configured to apply haptic feedback in three dimensions based on applying signals to each of the planar coils.

11. The device according to claim 7, wherein the controller is configured to detect force applied on the tip in three dimensions based on a detected capacitive coupling between the resilient element and a conductive element on each of the substrates, wherein the conductive element is the planar coil or an electrode patterned on the substrate.

12. A method comprising:
    fixing a resilient element to a tip that extends out of a housing and is movable with respect to the housing, wherein the resilient element includes magnetic material and wherein the magnetic material is conductive;
    positioning a plurality of substrates in a pyramid structure to face the resilient element and fixed to the housing;
    wherein the resilient element is configured to press against at least one surface in response to the tip receding toward the housing;
    wherein at least two substrates include a coil that is patterned on the substrate;
    inducing haptic feedback via the tip based on applying a current flow in the coil, wherein the current flow is configured to induce a magnetic driving force on the resilient element; and
    detecting capacitive coupling between the coil and the magnetic material of the resilient element based on applying a constant voltage across the coil, wherein the capacitive coupling is related pressure on the tip.

13. The method according to claim 12, comprising detecting pressure on the tip based on changes in the capacitive coupling between the resilient element and a conductive element on at least one substrate, wherein the changes in capacitive coupling is based on deformation of the resilient element as it presses against the surface.

14. The method claim 13, comprising defining the haptic feedback based on the pressure detected.

15. The method according to claim 12, comprising simultaneously applying signals on each planar coil, wherein in the signals are either the same signal or signals that differ in at least one of amplitude, frequency and phase.

16. The method according to claim 12, wherein each of at least two substrates is patterned with a planar coil that is magnetically coupled to the resilient element.

17. The method according to claim 16, wherein the resilient element is a rounded element fitted into the pyramid structure and configured to press against each of the substrates of the pyramid structure.

18. The method according to claim 16, further comprising simultaneously applying signals on each of the planar coils, wherein the signals are either the same signal or signals that differ in at least one of amplitude, frequency and phase.

19. The method according to claim 16, further comprising detecting force applied on the tip in three dimensions based on a detected capacitive coupling between the resilient element and a conductive element on each of the substrates, wherein the conductive element is the planar coil or an electrode patterned on the substrate.

20. The method according to claim 12, wherein inducing the haptic feedback is further based on a tilt sensor.

\* \* \* \* \*